July 7, 1942.                H. J. ATKINSON                2,288,669
                             TRANSMISSION BELT
                             Filed Nov. 25, 1940
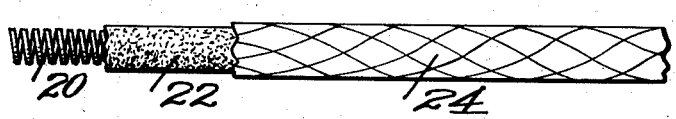
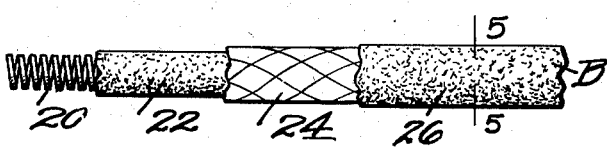
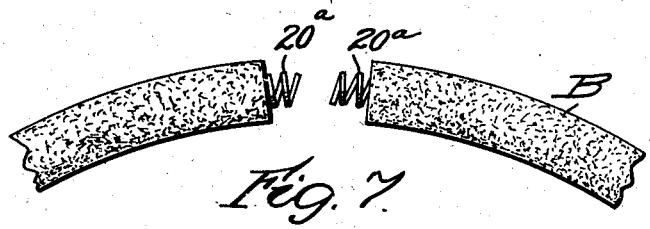 
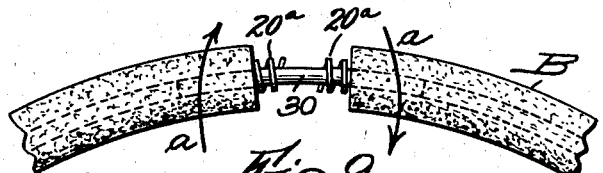
Inventor.
Herbert J. Atkinson
by attorney
Chas. P. Hawley Patented July 7, 1942

2,288,669

UNITED STATES PATENT OFFICE 2,288,669

TRANSMISSION BELT

Herbert J. Atkinson, Sudbury, Mass.

Application November 25, 1940, Serial No. 367,001

3 Claims. (Cl. 74—238)

This invention relates to transmission belts and particularly to belts for transmitting relatively light power or which are used in driving relatively small machines, such as sewing machines, or as units in multiple belts.

It is the general object of my invention to provide a transmission belt of a new and improved construction, which belt possesses substantial advantages in use and operation.

To the attainment of this general object, I provide a rubber belt which has a controlled and limited lengthwise stretch. I also provide a belt so constructed that the two ends of the belt may be conveniently and easily joined together without the use of tools and without any separate fastening devices. My improved belt, when its ends are thus connected, presents a substantially continuous surface at the joint, thus insuring smooth running of the belt at any reasonable speed.

My invention further relates to arrangements and combinations of parts which will be hereinafter described and more particularly pointed out in the appended claims.

A preferred form of the belt is shown in the drawing, in which—

Fig. 1 is a side elevation of the wire core of my improved belt, but with the coils slightly separated for clearness;

Figs. 2, 3 and 4 are side elevations showing successive steps in the manufacture of my improved belt;

Fig. 5 is a cross section of the complete belt, taken along the line 5—5 in Fig. 4;

Fig. 6 is a view similar to Fig. 5 but showing a modified cross section;

Fig. 7 is a side elevation showing the two ends of a piece of belt separated but in juxtaposition;

Fig. 8 is a side elevation of an aligning device;

Fig. 9 is a side elevation showing the two ends of the belt aligned by the device shown in Fig. 8; and Fig. 10 is a side elevation showing the ends of the belt in connected relation.

Referring to the drawing, my improved transmission belt B comprises a wire core 20 preferably formed as a closely coiled wire spring and which extends the entire length of the belt.

Having provided the wire core 20, I then apply a coating 22 of rubber to the core 20, which coating surrounds and closely engages the coils of the wire core and in which coating the core is embedded.

I then apply a braided textile covering 24 over the coating 22. This covering comprises a sleeve snugly fitting the coating 22 and preferably formed by braiding directly on the coating 22. The braided covering 24 is to be formed of cotton or other suitable non-elastic textile fibres.

I then apply an outer covering 26 over the braided covering 24, which outer covering is also formed of rubber embedded in and enclosing the braided covering and forming the outer or wearing layer of the belt.

A transmission belt as thus constructed has the advantage of a slight lengthwise yield, so that it will firmly engage small pulleys on close centers. It also has the advantage that it cannot be stretched enough to distort the coils of the wire core and thus give the belt a permanent set.

Such excessive stretch is effectively prevented by the braided covering 24, which can be substantially elongated only when correspondingly reduced in diameter. As the covering 24 snugly embraces the rubber coating 22, only slight contraction is possible and only correspondingly slight elongation of the belt can take place.

Consequently my improved belt, while possessing the yielding advantage of other rubber or elastic belts, is so constructed that excessive stretch and permanent distortion of the wire core is not possible.

It will be obvious that the cross section of the belt may be varied within substantial limits as indicated in Fig. 6, where I have shown the belt adapted for a V-belt drive.

In Figs. 7 to 10 I have shown a simple and convenient means of connecting the abutting ends of my improved belt B without the use of tools or separate fastening members. To accomplish this result, I cut the belt to the desired length and then pull out and slightly separate the end turns 20$^a$ of the closely coiled wire core, as indicated in Fig. 7.

I then insert a short aligning member 30 of rawhide or other suitable flexible material in the axial openings at the abutting ends of the belt and within the wire core 20, as indicated in Fig. 9. This member 30, when thus inserted, keeps the two ends of the belt in alignment, so that the connecting operation may be conveniently performed.

I then back-twist the two ends of the belt in opposite left-hand directions, as indicated by the arrows $a$ in Fig. 9. This back-twisting movement may amount to two or three relative turns of the adjacent ends of the belt.

I then slide the ends of the belt along the member 30 until the projecting open turns 20$^a$ of the wire core 20 are in contact, after which the ends of the belt are released and the abutted spring ends are screw-threaded into each other by the return movement of the belt ends to normal relation.

The two ends of the belt are thus drawn firmly together, as indicated in Fig. 10, making a smooth and permanent butted joint and leaving no crack nor opening to produce irregular action at high speed.

If it is desired to remove the belt for any purpose, the ends may be separated by untwisting the ends in lefthand opposite directions to unscrew the coacting coils 20a.

I have thus provided a rubber belt which is convenient and effective, particularly in small sizes, and which has a slight but limited stretch. I have also provided a belt in which the ends may be conveniently and securely joined together without the use of tools or any separate fastening devices.

Having thus described my invention and the advantages thereof, I do not wish to be limited to the details herein disclosed, otherwise than as set forth in the claims, but what I claim is:

1. A transmission belt having a slight predetermined stretch only and comprising a spiral wire core, a rubber coating for said core, a textile sleeve of non-elastic material braided on and closely fitting said rubber coating and limiting the longitudinal stretch of said belt, and an outer wearing surface enclosing and protecting said braided sleeve.

2. A transmission belt having a slight predetermined stretch only and comprising a closely coiled spiral wire core, a rubber coating for said core, a layer of nonelastic material braided on and closely fitting said rubber coating and limiting the longitudinal stretch of said belt, and an outer rubber layer embedded in and enclosing said braided sleeve and forming an outer wearing surface for said belt.

3. A transmission belt having a slight predetermined stretch only and comprising a piece of closely coiled spiral wire core, a rubber covering embedded in and enclosing said core, and textile braided means to limit the longitudinal stretch of said belt, the end coils of said wire core projecting slightly beyond both ends of said rubber covering and being more openly spaced than the rest of the wire core and being effective when in screw-threaded engagement with each other to permanently connect and closely abut the ends of said belt.

HERBERT J. ATKINSON.